United States Patent Office 3,267,019
Patented August 16, 1966

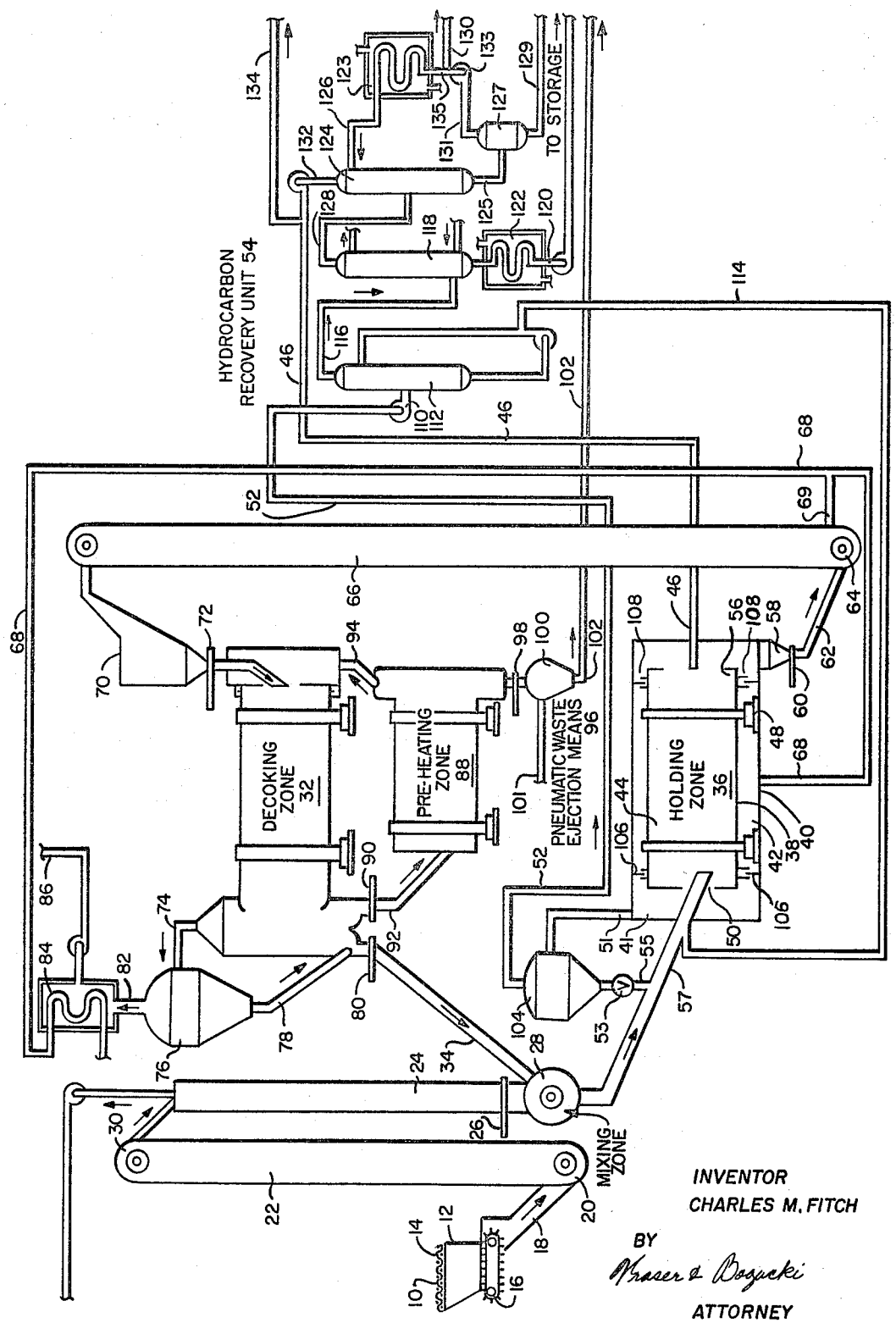

3,267,019
OIL RECOVERY
Charles M. Fitch, Houston, Tex., assignor to Signal Oil and Gas Company, Houston, Tex.
Filed Mar. 26, 1963, Ser. No. 268,006
4 Claims. (Cl. 208—11)

The present invention generally relates to oil recovery, and more particularly relates to an improved process for recovering oil from oil-bearing solids such as tar sands and oil-shales Various processes have been developed for the recovery of oil from oil-bearing solids such as oil shales and tar sands. The bituminous material in tar sand is essentially the same as crude oil and thus can be recovered by hydroflotation methods. However, the solid bituminous material in oil shale must first be thermally cracked in order to separate it as oil from the gangue material with which it is associated. Accordingly, processes which are suitable for the recovery of oil from both oil shale and tar sand generally include thermal cracking steps. Thus, in one known process, oil is recovered from tar sand by passing the sand directly into a hot sand bed which is maintained in the fluidized state by passing a gas upwardly therethrough at a high velocity. In the fluidized bed, bituminous sand lumps, which may have been previously crushed to fairly small size, break down to free-flowing sand particles. Some cracking of the oil contained in the bituminous sand occurs, together with the formation of process gas. The oil flashed from the sand is carried by the fluidizing gas through a hot cyclone to remove dust, then through an electrical precipitator and finally into one or more condensors to recover the oil. After the removal of oil therefrom, the bituminous sand is withdrawn from the fluidized bed down a standpipe and is blown by air into a burner where coke is burned off the sand, the sand being heated up thereby. A portion of the hot decoked sand is then recycled directly to the fluidized bed as a heat source, while the remainder of the hot decoked sand is discarded.

It is generally recognized that there are several serious disadvantages to such a fluidized procedure. In this regard, the procedure is usually very sensitive to particle size. Accordingly, the feed solids and the recycled solids must be of suitable size, usually between 100 and 200 mesh, or the fluidizing is impaired, with consequent operating difficulties.

Moreover, the fluidizing procedure requires a large volume of gas per unit time flowing at a relatively high velocity upwardly through the bed of sand to keep the bed in the required fluidized state. Accordingly, the hydrocarbon-bearing effluent from the cracking operation is highly diluted with the fluidizing gas. This increases the difficulty and cost of recovery of both the fluidizing gas and the effluent.

Oil has also been recovered from oil-bearing solids by processes which avoid dilution of the hydrocarbon effluent by transferring heat to the feed through metallic or ceramic walls. However, such processes are generally relatively inefficient, and have an initially high cost of equipment, with a considerable equipment attrition rate during use.

A third type of process for recovering oil from sand and shale employs a special type of particulate material of controlled size and shape as the heat transfer medium. Such particulate material usually comprises ceramic or metal balls. In the process, the balls are first heated by hot combustion gases and are then mixed in a still directly with particulate (crushed) shale or sand to accomplish the desired heat transfer and bring about oil removal. The balls are then removed from the reaction zone, and usually screened two or three times in order to remove from them the shale or sand. The coke is burned off the separated spent retort solids to produce hot combustion gases which are required to reheat the balls for reuse. Such a process incorporates a large number of steps and a considerable amount of expensive process equipment, so that it is relatively expensive to operate. Thus, the balls used in the described process require a separate ball heater, screens to separate the materials to be processed from the balls, and separate conveyors. Moreover, the balls usually are less efficient heat media than are recycled decoked feed solids. The described process requires high temperatures in the decoking operation, so that the balls can be reheated to an effective temperature for reuse. However, such high temperatures above 1100–1300° F., are not needed for effective coke burning and there is no advantage in such high coke burning temperatures per se.

Thus, there has been a need for an efficient, simple process for extracting oil from oil-bearing sands, shales and the like. Such process should be capable of using relatively inexpensive equipment at sufficiently low temperatures so as to minimize both initial capital outlay and attrition of the equipment. Preferably, there should be little or no dilution of the hydrocarbon effluent with combustion gases.

Accordingly, it is a principal object of the present invention to provide improved recovery of oil from oil-bearing sands, shales and the like.

It is a further object of the present invention to provide an improved process for the efficient and inexpensive recovery of oil from oil-bearing sand, shale and the like.

It is also an object of the present invention to provide a simple process for recovery of oil from oil-bearing solids at a temperature which permits the use of relatively inexpensive equipment and which will effectively cope with the inherently difficult problem of attrition of process equipment.

It is also an object of the present invention to provide an improved process and means utilizable both in the cracking of hydrocarbons and in the recovery of oil from hydrocarbon-bearing solids such as sand, shale and the like, which process and means afford improved handling of the solids.

It is a still further object of the present invention to provide a process for the efficient removal of oil from oil-bearing solids without substantial dilution of volatilized hydrocarbons during recovery thereof with combustion gases.

These and other objects are accomplished, in accordance with the present invention, by providing an improved process for the recovery of oil from tar sand, oil shale and other oil-bearing solids. The improved process includes the recycling of hot decoked feed solids to a point, prior to the still or retorting zone, wherein the recycle solids contact and are mixed with fresh feed sand, shale or the like, initiate cracking thereof and materially assist in the particle size-reduction thereof. In such initial mixing zone, the feed solids can also be ground, pulverized, etc., to free-flowing particles, preferably of substantially the same particle size as the recycle solids. The recycle solids prevent balling up or clogging of pulverizing equipment in the mixing zone due to plasticized feed. Such recycling of the decoked solids to an initial mixing (and, preferably, particle-size-reducing) zone provides improved heat transfer efficiency and results in improved recovery of oil in the subsequent still, holding or retorting zone, and at a relatively low temperature. Large quantities of fluidizing gases are not needed, so that recovery of the oil is simplified. Moreover, the equipment used in the process is inexpensive and is durable.

The improved process, in contrast to fluidized bed processes, is essentially insensitive to particle size of the feed and recycle solids. Conventional processes utilizing shaft type retorts in which the feed is contacted directly with hot combustion gases cannot operate properly with an appreciable amount of fines, that is, finely divided particles in the feed, whereas the present process functions properly with recycled fines.

In one embodiment of the present process, novel means are provided for efficiently disposing of excess decoked solids. Thus, steam is generated therefrom by contacting water with the hot solids. The steam is utilized to pneumatically convey the excess solids from the system.

As one particular example of the present process, tar sand in up to steam shovel sized chunks is passed through a pulverizer in which it is intimately mixed with hot decoked sand having a temperature of about 1200° F. The weight ratio of the recycled sand to the fresh feed sand in about 5.7:1. The hot recycle sand heats the feed sand to about 950° F. in the pulverizer, aids in the breakdown of large lumps of the feed in the pulverizer and also initiates cracking of the oil in the feed.

The pulverized particulate hot mixture is then dropped directly from the pulverizer into a rotary retort and is passed therethrough for a seven minute retorting time at 950° F., the hot mixture being tumbled or cascaded approximately 8.75 times per minutes. Hydrocarbons vaporize and are stripped from the mixture by means of countercurrently flowing purge gas, preferably superheated steam, although recycled retort gas or any hydrocarbon gas can be used. The purge gas-vaporized hydrocarbon effluent mixture passes to a hydrocarbon recovery unit, the purge gas, when a hydrocarbon purge gas is used, being recycled back to the retort for repassage therethrough countercurrent to the solids flow, and the hydrocarbons, including oil and gas, being recovered and passed to storage, to a product pipeline, etc.

The stripped solids mixture passes from the retort to a rotary coke burner in which the residual hydrocarbons are burned therefrom, heating the solids sufficiently (to 1200° F.) so that they can be utilized as hot recycle solids, that is, so they can be passed back to the pulverizer unit. Some of the hot decoked solids are discarded, after they pass through an air preheater. The air heated thereby is used in the coke burner. In discarding the hot solids, such solids go into a unit wherein they are directly contacted with water to generate steam. The steam is used to provide pneumatic conveying of the excess solids out of the system and into a waste area.

A further understanding of the invention will be apparent from a study of the following detailed description and of the accompanying drawing, of which the single figure is a schematic flow diagram illustrating a preferred embodiment of the process of the present invention.

Now referring more particularly to the steps of the present process, an oil-bearing solids feed, that is solids from which oil can be recovered, as by cracking, vaporization, etc. and which may comprise, for example, oil shale, tar sand or the like is treated. Preferably, the feed solids are selected from the group consisting of tar sand, oil shale, and mixtures thereof. The feed solids are intimately mixed with hot recycle solids comprising decoked feed solids from which the oil has been stripped. The recycle solids are at a sufficiently high temperature so that the resultant feed solids-recycle solids mixture is above the minimum temperature necessary to initiate cracking of the hydrocarbons in the feed solids.

Any suitable relative concentration of the fresh feed solids and the recycle solids can be used, as determined by heat balance calculations or the like. However, it has been found that for the greatest efficiency of heat transfer and greatest ease of pulverizing and mixing, and, moreover, in order to minimize clogging and balling of equipment with plasticized bituminous material, it is desirable that the hot recycle solids be present in a major proportion, by weight, with respect to the fresh feed solids. Moreover, it has been found that a particularly suitable ratio of hot recycle solids-to-fresh feed solids, on a weight basis, is between about 5:1 and 6:1, most preferably about 5.7:1.

The hot recycle solids are usually derived from a decoking zone in which feed solids stripped of vaporized hydrocarbons are decoked of residual carbonaceous material and during decoking are heated to a relatively high temperature, for example up to about 1300° F. When a preferred concentration of, for example, about 5.7 parts (by weight) of the recycle solids at about 1200° F. is added to one part of the fresh feed solids in the mixing zone, the feed is heated during the mixing and pulverizing to a cracking temperature of about 950° F.

It has been found that the optimum temperature range for the mixture in the mixing zone and in the subsequent holding zone where hydrocarbons are vaporized therefrom is between about 800 and about 1050° F., while any temperatures within the range of about 750° F. to about 1300° F. produce useful products. At the lower end of the temperature range, cracking of the hydrocarbons and release from the feed solids in the mixing and holding zones is usually too slow to be practical. Moreover, low temperatures usually decrease ultimate yields of hydrocarbons from the feed solids. At and beyond the upper end of the indicated temperature range for the solids mixture, further improvements in yields over more moderate temperatures are not obtained; moreover, commercially available relatively inexpensive, and therefore economically feasible, equipment tends to rapidly deteriorate at elevated temperatures. The feed solids are initially at ambient temperature and, accordingly, the recycle solids must be at temperatures considerably in excess of 1300° F. if a 1300° F. temperature is desired for the feed solids-recycle solids mixture. However, equipment exposed to temperatures much in excess of 1300° F. tends to rapidly deteriorate unless constructed of special high temperature (and therefore expensive) metals. Moreover, at temperatures above about 1200° F., excessive cracking of the hydrocarbons in the feed solids may occur with consequent loss of normally liquid hydrocarbon yield. In order to prevent such an occurrence, the hydrocarbons released from the feed solids in the holding zone must be very rapidly removed therefrom. This, in turn, requires a relatively high rate of purge gas flow through the holding zone. Flow control problems are thus created, complicating and increasing the cost of hydrocarbon recovery from the purge gas, due to the larger concentration of purge gas. Accordingly, for practical purposes it is undesirable to utilize cracking temperatures above about 1200° F. for the feed solids-recycle solids mixture.

The mixing of the feed solids with recycle solids is carried out in a selected mixing zone. The fresh feed solids are passed thereto by any suitable means. For example, as shown in the accompanying schematic flow diagram, the fresh feed solids 10 can pass into a feed hopper 12 which may, if desired, be covered with a screen 14. The solids 10 may pass through a variable rate feeder 16 and through a conduit 18 into the boot 20 of a bucket elevator 22 in which the feeds are lifted to above the level of a feed seal hopper 24, the bottom of which is connected through a rotary seal 26 to a mixing zone 28. As illustrated, the fresh feed 10 passes into seal hopper 24 from elevator 22 by means of conduit 30. The mixing zone is also connected to a source of hot recycle solids, specifically, a decoking zone 32, by means of a conduit 34.

In most instances, the fresh feed solids are not in a pulverized or particulate form, but instead are lumps or chunks of various sizes. Accordingly, the mixing zone is preferably also a particle size-reducing zone or pulverizing zone in which both mixing and particle size-reduction of the feed simultaneously are carried out. For such purposes, the mixing zone can be a tumbler, cage mill, pug mill, roll mill, ring roll mill, cone mill, disk grinder, ball mill, attrition mill or the like, preferably a hammer mill, as illustrated in the schematic flow diagram. The feed solids are preferably subjected to size reduction during mixing with the recycle solids.

However, it will be understood that it is within the scope of the present invention to provide as the feed solids, material which already is in particle form, preferably with a major portion of particle size similar to that of the recycle solids. In such event, the feed solids can merely be intimately mixed with the hot recycle solids in the mixing zone, without necessitating further particle size reduction.

The hot recycle solids are highly efficient heat transfer media, being readily and intimately mixed with the fresh feed solids and capable of rapidly heating the feed solids to initiate hydrocarbon cracking in the mixing zone. The fresh feed solids are more easily pulverized to particulate form when heated thereby. Moreover, the hot recycle solids are present preferably in a sufficiently high concentration to eliminate agglomeration or accumulation of plastic bituminous feed material in the mixer, pulverizer or the like or in other equipment of the process, as previously described.

It will be understood that the present invention, in contrast to most conventional processes, can utilize as the fresh feed solids material which is of any size and shape, from fines to lumps as large as steam shovel size. The mixing and simultaneous pulverizing are very rapid so that the resultant solids mixture can be rapidly moved out of the mixing zone and into a holding zone, which may be a retort, etc. wherein the feed is cracked and hydrocarbons are volatilized and stripped therefrom. The solids mixture passing to the holding zone can include a minor proportion of over-size feed solids, without adversely affecting separation of hydrocarbons from the feed in the holding zone. Accordingly, a high capacity relatively inexpensive pulverizer mixer unit which will pass a small proportion of oversize material can be used as the mixing zone. The rapid treatment of solids in the mixing zone facilitates the operation of the present process on a continuous basis. It will be understood that the present process can also be operated batch-wise and semi-continuously.

The holding zone 36, illustrated in the flow diagram, may comprise a vessel of any suitable size and shape which vessel permits effective cracking and separation of hydrocarbon vapors from the feed solids and in which purge gases can be used to facilitate the removal of the hydrocarbon vapors from the holding zone at a controlled rate. However, it is preferred to use a relatively simple, inexpensive and particle size-insensitive system such as the rotary drum type retort shown in the flow diagram, which retort can be equipped with lifter flights or some other device to facilitate adequate contact of the purge gas stream with the solids. Such solids-gas contacting devices can also include, for example, louvers, spargers or the like. Alternatively, a vertical, multiple deck-type retort equipped with rakes or plows to keep the solids mixture moving from deck to deck so as to facilitate cracking and removal of hydrocarbons therefrom can be used. Thus, some movement and agitation of the solids mixture in the holding zone is desired.

Even fluidized type retorts can be utilized as the holding zone, with some success. So also can other systems wherein the solids mixture is agitated or otherwise moved to facilitate separation of the vapors from the solids through the use of a purge gas stream. It will be understood, however, that if, for example, a fluidized bed were to be utilized, although improved heat transfer, and rapid particle-size reduction would be provided by the mixing step, other advantages normally enjoyed with the present process would not be present, e.g. minimal quantity of purge gas, particle size insensitivity, etc. Accordingly, it is preferred to utilize particle size-insensitive equipment as or in the holding zone 36.

The holding time of the solids mixture in the holding zone can be any suitable holding time, depending upon the temperature in the zone. It should be sufficiently long to assure adequate removal of vaporizable hydrocarbons from the feed solids, but should be short enough to avoid excessively high equipment and process costs. The rapid mixing of solids and the consequently rapid heat transfer between the solids in the mixing zone contribute to the overall efficiency of this process. There is no necessity to use excessively hot solids to effect an efficient heat transfer. The elimination of excessively hot solids in the holding zone in turn allows a considerable latitude in the holding time in the holding zone. Hydrocarbon vapors can be sufficiently slowly removed from the holding zone to minimize the amount of purge gas used in such zone, without adversely affecting the nature of the hydrocarbons stripped from the solids in the holding zone. Thus, the advantage of rapid stripping and removal of hydrocarbons from the holding zone can be balanced against the rise in process costs which occurs with increase in speed of such removal, as reflected in purge gas generation costs, and costs of condensing and separating larger volumes of purge gas, so that a holding time can be selected which maximizes the benefits obtained from the process.

It has been found that a relatively short holding of from 7 to about 20 minutes in the holding zone is usually sufficient to assure adequate stripping of hydrocarbons from the solids. For example, a time of about 7 minutes can be used where the solids mixture in the holding zone is at a temperature of between about 850° F. and about 1050° F., preferably about 950° F. During such period of time, the volatile hydrocarbons are vaporized from the feed solids and are swept out of the holding zone (by the purge gas) to a hydrocarbon recovery unit.

The purge gas can be natural gas, manufactured gas, steam, preheated or superheated, or other suitable gas. Preferably, the purge gas is superheated steam, introduced in a way to blanket potential leaks of inflammable hydrocarbon gases from the holding zone. Superheated steam can be made available as purge gas at low cost from heat available from combustion gases from the subsequently described decoking zone and/or from waste decoked hot solids. Superheated steam provides an important safety factor in that it is not inflammable. Moreover, it can be readily condensed and separated from the stripped hydrocarbons so that no dilution or contamination of such hydrocarbons is caused by the use of steam. Steam may conveniently be the only purge gas material or there may be supplementary purge gas introduced directly into the holding zone which at least partially may comprise normally gaseous hydrocarbons which have been recovered in the hydrocarbon recovery unit from the hydrocarbons removed from the feed solids in the holding zone and which have been recycled thereto. The purge gas is utilized in a volume and at a flow rate sufficient to assure a continuous removal from the holding zone of hydrocarbons vaporized from the feed solids. The purge gas is preferably passed countercurrent to the solids mixture direction-of-flow in the holding zone for more efficient stripping. The purge gas flow rate will necessarily vary, depending on the particular system and holding zone.

As an example of a typical holding zone 36, an 11 foot diameter by 100 foot long horizontally orientated rotary retort 38, shown in the accompanying flow diagram, can be used to provide a 7 minute solids mixture residence time. The solids loading in the retort can be held at about 15% of the cross-sectional area of the retort. Such a retort can provide vigorous agitation of the solids mixture therein. Thus, for example, the solids mixture can be cascaded about 8.75 times per minute, or about 1.75 times per revolution of the retort.

The retort 38 can be and is preferably enclosed within an outer jacket or enclosure 40 spaced therefrom. The space 42 between the retort 38 and the outer enclosure 40 can be at a higher pressure than the space 44 inside the retort 38 so that purge gas, which is preferably superheated steam, can be readily fed into space 42, as by line 68, and then into the retort 38 countercurrent to the direction of flow of the solids mixture in the retort 38. This pressure differential prevents inadvertent escape of the solids mixture from the retort 38 as entrained fines and, accordingly, prevents fouling of trunnion rolls and bands and accessory equipment, generally designated 48, and utilized in providing rotation of the retort 38.

Recycle gas can be passed back to retort 38 from an associated hydrocarbon recovery unit 54, as by line 46. Purge gas mixed with stripped volatilized hydrocarbons passes out of the feed entry end 50 of retort 38 and from the feed end plenum chamber 41 portion of the enclosure 40 through a suitable line 51 to the cyclone 104, then through line 52 to the hydrocarbon recovery unit 54. Fines separated in cyclone 104 pass therefrom through valve 53 and line 55 running to retort 38, as shown in the accompanying drawing. Simple labyrinth seals 106 and 108 can be provided adjacent the feed end 50 of the retort 38 and the discharge end 56 of the retort 38.

It has been found that, as indicated above, various temperatures, holding times, solids and purge gas flow rates, etc. can be utilized for the cracking and hydrocarbon vapor removal in the holding zone 36. Selection of suitable parameters for a particular oil recovery operation can readily be made by one skilled in the art, in accordance with the foregoing.

The described system is also somewhat self-adjusting. In this regard, if a relatively low temperature, for example, 750° F.–800° F. is utilized in the holding zone 36, the immediate effect is to reduce the hydrocarbon yield, that is the concentration of hydrocarbons vaporized from the feed solids in the solids mixture. Accordingly, a higher concentration of carbonaceous residue remains on the stripped solids which are then passed to the decoking zone 32 wherein the residue is burned off of the solids. During decoking, generally the higher the concentration of burnable carbonaceous residue on the stripped solids, the higher the temperature to which the solids are heated. When the decoked solids are recycled for reuse in the mixing and holding zones, the temperature of the solids mixture formed therefrom by mixing with fresh feed solids is thus increased. Accordingly, the concentration of hydrocarbons vaporized therefrom also increases for a fixed residence time in the holding zone and the concentration of carbonaceous residue left thereon decreases. The somewhat self-regulating features of the present process simplify efficient operation thereof and minimize undesired fluctuations in temperature and yield.

In accordance with the process of the present invention, the mixture of hot recycle solids and feed solids, with the feed solids now stripped of vaporizable hydrocarbons but still containing carbonaceous residue, is passed to the decoking zone 32 wherein the residual carbonaceous materials are burned therefrom, thus converting the feed solids into hot decoked solids suitable for use as recycle solids.

Any suitable means can be utilized to transfer the solids mixture from the holding zone 36 to the decoking zone 32. For example, as shown in the accompanying schematic drawing, the solids mixture can discharge from end 56 of rotary retort 38 into a hopper 58 above a variable speed rotary feeder 60 and through the feeder 60 and line 62 into the boot 64 of a bucket elevator 66. Purging steam can be bled into the bottom of the elevator 66, as through lines 68 and 69, in order to maintain a slightly higher pressure in the elevator 66 than in the retort 38, so that a relatively small amount of steam leaks from the elevator 66 into the retort 38. This is to assure that a noncombustible atmosphere exists in the housing of the elevator 66. The bucket elevator 66 can be sized so as to be able to carry the solids mixture away from the retort 38 faster than it flows out of the retort 38, thus assuring that the buckets, for example, are never entirely full and that the elevator boot 64 is always kept in a clean condition.

As shown in the accompanying drawings, the solids mixture can, for example, pass from the bucket elevator into a suitable hopper 70 or other container means positioned above a variable speed rotary feeder 72 and can pass through the feeder 72 into the decoking zone 32. It is desirable that the rotary feeder 72 or its equivalent, be operated at a speed such that a small head of solids mixture is maintained in the hopper 70. This minimizes steam leakage from the elevator 66 into the decoking zone 32, and, accordingly, minimizes the loss of purge steam and the waste of heat needed to elevate the temperature of excessive amounts of steam in the decoking zone.

The decoking zone can be of any suitable type, but it is preferred that it be insensitive to particle size. Thus, it is preferred that the decoking zone 32 not be of the fluidized solids type but instead be, for example, of the horizontally disposed rotary retort type, or be in the form of a vertical multiple deck retort equipped with rakes or plows to keep the solids moving from deck to deck therein, etc. For example, a rotary drum equipped with lifter flights or a rotary drum equipped with louvers or a vertical or inclined shaft equipped to provide the necessary holding time to the solids passing through it can be used. It is thus preferred that the decoking zone be of generaly similar type to the holding zone 36.

However, it will be understood that any equipment can be selected for use as the decoking zone 32 provided that good contact of preferably preheated air is afforded with the solids mixture for a sufficiently long period of time to assure efficient combustion of the carbonaceous residue on the stripped feed solids so as to produce the desired hot decoked solids. There is no necessity or desirability to provide an enclosure such as enclosure 40 around the primary decoking equipment.

Gases produced during burning of hydrocarbons from the stripped feed solids can be passed from zone 32, as by line 74, and into a cyclone 76, as shown in the accompanying drawing, for separation of entrained fines therefrom, which fines can then be passed downwardly, as through line 78, into a rotary feeder 80 feeding into line 34 which runs back to the mixing zone 28. The gases flowing from the cyclone 76 through line 82 can pass through a heat exchanger 84 to which line 68 is connected, so as to generate steam for purge gas and for pressurizing elevator 66, as previously described, and then can be vented from the system, as by line 86.

As previously indicated, hot decoked solids from decoking zone 32 are recycled to the mixing zone 28, as through feeder 80 and line 34. However, usually a portion of the solids passing from zone 32 are disposed of as waste. Before such disposal, the hot waste solids can be utilized for one or more purposes, as described hereinafter.

As previously indicated, air fed into the decoking zone 32 is preferably preheated to increase the efficiency of operation of the zone 32. Preheating of the air can be carried out in a suitable zone 88 of any suitable construction, which provides adequate contact between the air and the decoked solids which have passed thereto from zone 32, as by rotary feeder 90 and line 92. Direct contact between the air and hot solids is desired in such a system. As shown in the accompanying schematic drawing, the air preheater 88 may be situated immediately below the decoking zone so that hot recycle solids produced in zone 32 can be readily passed thereto and immediately contacted with air. The air thus preheated is then passed to zone 32 through line 94 for use in decoking additional stripped feed solids.

As further illustrated in the accompanying drawings, the hot decoked waste solids from zone 32 are then preferably passed to a suitable waste ejection means 96, as through valve 98 or the like connected to the discharge end of preheating zone 88. Alternatively, hot decoked solids can be passed directly from zone 32 to means 96. Ejection means 96 is preferably of a pneumatic type and may comprise a confined zone or vessel 100 having an outlet connected to a waste solids disposal line 102. A metered amount of water of any quality, for example, sea water, brackish water or the like, is passed as by line 101, into direct contact with the hot solids therein. The water is thus flashed into stream by the hot solids which are still at a temperature substantially in excess of the boiling point of water. The steam effects pneumatic ejection of the solids from zone 100 through line 102 to a waste disposal area outside the system. Thus, the steam can provide the energy with which to operate a pneumatic conveyor system or the like. Accordingly, improved means and method are provided for pneumatically conveying hot solids, such as stripped and decoked solids from the present oil recovery process, to a desired location. The pneumatic conveying method is also applicable to other systems in which solids having temperatures well above the boiling point of water are involved.

The present process simply and effectively strips and recovers hydrocarbons, including oil, from oil-bearing solids, such as tar sand and oil shale, at low cost. For the recovery of the hydrocarbons, unit 54 is provided. One such typical unit is illustrated in the accompanying schematic flow diagram in which unit normally liquid and normally gaseous hydrocarbons are separated from impurities and from each other. These hydrocarbons are obtained from the volatilized hydrocarbon effluent-purge stream mixture passing from retort 38 through line 51. Such mixture, after passage through cyclone 104, travels in line 52 to pump 110 and into a hot wash tower 112 wherein it is scrubbed free of impurities, particularly additional fines, which fines are returned to the inlet side of holding zone 36, as through line 114 and chute 57. The resulting purified effluent vapors pass through line 116 into the condensor 118, wherein they are cooled, liquified hydrocarbons being removed through cooler 122 and line 120 for passage to liquid product storage. The effluent vapor in the condensor 118 may pass therefrom by line 128 to the light ends recovery unit 124 for final liquifaction. Condensed distillate is withdrawn, as by line 125, to a water separator 127, from which water is removed, as by line 129. The liquid hydrocarbons pass to storage through line 131, pump 133 and line 130 connecting with pump 133, or can be recycled to unit 124, as by line 131, pump 133, line 135 through cooler 123, and line 126. The gaseous hydrocarbon effluent passes from unit 124 through line 132, either to storage or a pipeline, as by connecting line 134, or back to the holding zone 36 as supplementary purge gas, as by connecting line 46.

It will be understood that other arrangements of means and equipment within the skill of the art can be utilized to effect the purification of the gases passing from holding zone 36 and to effect their separation into normally liquid products, such as hydrocarbon oil and the like and normally gaseous hydrocarbons, with recovery of the purge gas for reuse.

The following example further illustrates certain features of the present invention.

*Example*

Equipment substantially as set forth in the accompanying schematic drawing is utilized in accordance with the foregoing description for the continuous recovery of oil from tar sand at a tar sand processing rate of 1200 cubic yards per day. The tar sand is mined in chunks, and pulverized in hammer mill 28, being simultaneously mixed therein with hot decoked recycle sand from which the hydrocarbons have previously been stripped. The hot recycle sand is at a temperature of 1200° F. while the fresh feed sand is at ambient temperature. The weight ratio of hot recycle sand-to-fresh feed sand is 5.68:1 so that the mixture is discharged at a temperature of about 950° F. from the hammer mill.

The feed sand is pulverized and simultaneously mixed with hot recycle sand and the resultant mixture continuously passes to holding zone 36 comprising a horizontally disposed rotary retort 11 feet in diameter by 100 feet long, passing therethrough at a rate such that about 15% of the cross-sectional area of the retort is filled with the mixture. In the retort the mixture is held for an average residence time of 7 minutes at 950° F., while being cascaded 8.7 times per minute, or 1.7 times per revolution of the retort. The mixture in the retort is continuously counter-currently contacted with superheated steam. The steam is utilized at a flow rate of about 8,400 pounds per hour. Small concentrations of hydrocarbon purge gas are added from time to time to maintain a uniform loading on the cyclones. Stripped vaporized hydrocarbons are passed with the purge gas to the hydrocarbon recovery unit 54 wherein they are washed free of entrained sand and condensed to separate a liquid (oil) fraction for storage and a normally gaseous fraction, a portion of which is returned to the holding zone 36 as purge gas. The oil recovery is highly efficient and provides liquid hydrocarbons yields of from 80 to 100 percent of theoretical. The process is characterized by relatively higher ratios of liquid hydrocarbon:gaseous hydrocarbon yields, in contrast to conventional processes which require longer holding times of the oil-bearing solids in the retorting zone.

Hydrocarbon gas is recycled as desired, from unit 54 back to the holding zone 36 just inside the solids discharge end of the rotary retort 38 to supplement the steam purge gas, while the stripped solids mixture continuously passes out of the exit end of the retort 38 to the rotary coke burner 32. In the coke burner 32, the solids mixture is continuously decoked by burning the carbonaceous residue in contact with preheated air, the solids being heated to 1200° F. by such burning. Some of the decoked hot solids, enough to maintain the 5.68:1 recycle solids:feed solids ratio in the hammer mill 28, are recycled to the hammer mill 28 for reuse in heating fresh tar sand continuously passing into the hammer mill, so as to assist in pulverizing the same and to initiate cracking of the hydrocarbons therein.

The excess hot decoked sand is passed into the air preheater 88 and into direct contact with fresh air, preheating the air which then passes into the entry end of the rotary coke burner 32. The excess hot decoked sand is then passed into a blow case and contacted with water, whereby steam is created. The steam pneumatically forces the sand through a waste line into a waste pile located out of the system.

The described continuous operation is economically sound, and can be carried out for an extended period of time without breakdown of equipment or reduction in yield. The equipment is relatively inexpensive, in comparison with most conventional processes and, moreover, the processing steps are simple and the processing time is short.

In a second continuous operation, oil shale is processed in the manner described for the tar sand, except that the temperature of the recycle solids is 1250° F., the weight ratio of recycle solids: feed solids is 5.8:1 and the temperature of the solids mixture is about 1000° F. Residence time in the holding zone for the solids mixture is 8 minutes and yields are comparable to those obtained with the tar sand process.

Accordingly, an improved process is provided for the recovery of hydrocarbons, particularly oil, from oil-bearing solids, such as oil shale, tar sand and the like. The process is simple, inexpensive and efficient. Heat utilization and conservation are maximized, while equipment attrition is minimized. The process is suitable for use with any size feed. Recovery of the hydrocarbons released from the solids is simple, since they are not substantially diluted or contaminated. Moreover, there is very little vented gas, so that the problem of air pollution is eliminated. The extremely rapid transfer of heat effected by intimately contacting the feed with hot recycle solids from the coke burner of the process shortens the treatment time which, in turn, increases hydrocarbon yields, particularly liquid hydrocarbons. Efficient disposal of hot solids is also provided in a novel manner in accordance with an improved method for pneumatically conveying the solids. Other advantages of the present invention are as set forth in the foregoing.

While there have been described various embodiments of the method and the process of the present invention and equipment, means, steps and conditions for carrying out the process and the method, it will be appreciated that various modifications and alternative arrangements are also possible. Accordingly, this invention should not be considered to be limited to the arrangements which have been depicted and described, but should be taken to include all modifications and alternative arrangements falling within the scope of the appended claims.

What is claimed is:

1. In a process for the recovery of oil from oil-bearing solids, which process comprises passing oil-bearing solids into a holding zone and maintaining the solids in said zone at a temperature sufficient to vaporize hydrocarbons from said oil-bearing solids, recovering said vaporized hydrocarbons and passing coked solids from said holding zone to a decoking zone and burning carbonaceous residue from said coked solids to provide hot decoked solids having a temperature sufficient to initiate cracking of fresh, oil-bearing solids, the improvement which comprises passing at least a portion of said hot decoked solids to a mixing zone and simultaneously mixing said hot decoked solids with fresh oil-bearing solids and pulverizing said oil-bearing solids in said mixing zone, said hot decoked solids and said fresh oil-bearing solids being maintained in said mixing zone for a time sufficient to initiate cracking of hydrocarbons in said oil-bearing solids and for a time sufficient for transfer of heat from said hot decoked solids to said oil-bearing solids in said zone to facilitate said pulverizing of said oil-bearing solids in said zone, and thereafter passing the resultant hot pulverized mixture to said holding zone for vaporization of hydrocarbons therefrom.

2. The improvement of claim 1 wherein a portion of said hot decoked solids from said decoking zone are passed to a confined zone having an outlet connected to a waste disposal zone and wherein water is passed into contact with said hot solids in said confined zone, whereby sufficient steam is generated to effect pneumatic ejection of said hot decoked solids from said confined zone through said outlet line.

3. The improvement of claim 1 wherein said fresh oil-bearing solids are selected from the group consisting of tar sands, oil shales and mixtures thereof and wherein said hot decoked solids are recycled to said mixing zone in a controlled concentration with respect to fresh oil-bearing solids passing into said zone such that the resultant mixture of said fresh solids and recycled solids is substantially above the temperature required to initiate cracking of hydrocarbons in said fresh solids in said zone.

4. The improvement of claim 3 wherein said holding zone comprises a rotary retort and wherein the weight ratio of said recycle solids to said fresh-oil-bearing solids passing into said mixing zone is between about 5:1 and about 6:1.

References Cited by the Examiner

UNITED STATES PATENTS

| 2,480,670 | 8/1949 | Peck | 208—11 |
| 2,712,495 | 7/1955 | Clarke | 302—66 |
| 2,758,885 | 8/1956 | Rehbein | 302—66 |
| 2,768,938 | 10/1956 | Martin | 202—106 |
| 2,905,595 | 9/1959 | Berg | 208—11 |
| 3,019,059 | 1/1962 | McMurtrie | 302—66 |
| 3,051,644 | 8/1962 | Friedman et al. | 208—11 |
| 3,093,571 | 6/1963 | Fish et al. | 208—11 |

FOREIGN PATENTS

| 530,920 | 9/1956 | Canada. |

DANIEL E. WYMAN, *Primary Examiner.*

ALPHONSO D. SULLIVAN, *Examiner.*

H. LEVINE, P. E. KONOPKA, *Assistant Examiners.*